UNITED STATES PATENT OFFICE.

WILLIAM CLOUGH, OF CINCINNATI, OHIO.

IMPROVEMENT IN REFINING AND DECOLORIZING SACCHARINE AND OTHER LIQUIDS.

Specification forming part of Letters Patent No. 87,759, dated March 16, 1869; antedated February 27, 1869.

*To all whom it may concern:*

Be it known that I, WILLIAM CLOUGH, of Cincinnati, in the county of Hamilton and State of Ohio, have discovered a new and useful Improvement in Refining and Decolorizing Saccharine and other Fluids; and I do hereby declare the following to be a full, clear, and exact description of the same.

My improvement consists in the employment of hydrate of alumina and water-glass, (soluble silicate of soda or potassa,) added to the fluid separately and in proper proportions to produce the effect specified.

Alumina, as is well known, possesses an active affinity for organic coloring-matter, often combining with it and withdrawing it wholly from its solutions. The coloring-matter of cane and beet is acted upon by this agent, and to a considerable extent removed. When even a minute portion of hydrate of alumina is added to a dilute solution of water-glass, coagulation suddenly takes place. Added separately to saccharine and many other solutions, coagulation takes place when the fluid is brought to the boiling-point. The coagulation or precipitate thus formed in impure solutions—such as cane and beet juice—includes, with the silicate of alumina, earthy salts, gummy substances, and coloring-matter, together forming a dense coagulum, which may be either brought to the surface as a scum or carried to the bottom in the form of a sediment, as provided for by the operator, in either case effectually purifying the solution. It would be impossible to explain within suitable limits all the different modes in which these agents can be employed in defecating and decolorizing saccharine and similar solutions. I will therefore explain a single practical method, with one or two modifications, explaining at the same time a convenient method of producing the hydrate of alumina, accompanied with such remarks as will illustrate and explain the nature and scope of my improvement.

Cane or beet juice may be treated for refining at any density not much exceeding 22° Baumé. Sirups, sugars, and molasses to be refined should be reduced to a corresponding density—22° Baumé, or less. The alumina may be conveniently prepared by neutralizing a dilute solution of the commercial sulphate of alumina with chalk or milk of lime. The sulphate of lime formed in the reaction does no harm, and its presence may be unheeded. The water-glass or silicate may be prepared for use by reducing the ordinary commercial silicate with soft water to the density of 5° Baumé. For this purpose I prefer the highly-silicious silicate of soda. Cane or beet juice to be treated with these agents may be first subjected to the ordinary process of defecation by heat, with or without the use of lime, or they may be treated in their original state. If the latter, it will be proper to add milk of lime or some appropriate alkali enough to nearly neutralize the free acid, either before or in connection with the treatment. To one hundred gallons of juice add from one to two gallons of the 5° solution of silicate and as much of the prepared alumina as is afforded by one pound of the sulphate treated in the manner heretofore explained. If free acid is present in the solution, it may be neutralized, or nearly neutralized, with lime. Bring the prepared liquid to the boiling-point, when the impurities will appear upon the surface in the form of an abundant frothy scum, which may be skimmed off, or the clear liquid may be drawn off from below. Should the operator prefer to deposit the impurities as a sediment, add and stir into the one hundred gallons of juice, before adding the silicate and alumina, about two pounds of finely-ground sulphate of baryta. At the boiling-point some of the coarser impurities will appear upon the surface, and these may be removed. After violent boiling for a minute or two the fluid may be removed to settling-tanks, where the impurities will in a few minutes subside, allowing the clear liquid to be drawn off from above the sediment.

For refining crude sirups and sugars, reduce to a proper density and treat the solution as above prescribed, employing the silicate and alumina in somewhat greater relative proportions, about in proportion to the density of the solution compared with the ordinary density of cane and beet juice.

A compound of lime and alumina may be conveniently made and used as follows: To one part, by weight, of good quicklime, subsequently slaked and reduced to a thin milk of lime, add a dilute solution of one and one-half part of sulphate of alumina. This affords a slightly-alkaline compound. Use it in crude juice in quantity sufficient to neutralize, or nearly neutralize, the free acid. Use silicate as before prescribed, also sulphate of baryta, if required, for the purpose specified.

Hydrate of alumina and finely-ground or precipitated chalk afford a compound which may be used with the silicate, as above specified, for refining weak solutions. By the use of this compound the acid of the solution is neutralized and perfect defecation effected without exposing the saccharine matter of the solution to the caustic action of free lime.

In dense solutions the organic acid displaces the carbonic acid of the chalk but slowly, and is not therefore readily neutralized.

It will be understood that the use of lime, carbonate of lime, and sulphate of baryta is only incidentally referred to in the foregoing specification, and that they are not included as elements in my improvement as herein set forth.

What I claim as my improvement, and desire to secure by Letters Patent, is—

Refining and decolorizing saccharine and other similar fluids by the agents herein specified.

WM. CLOUGH.

Witnesses:
   W. G. STONE,
   W. V. CLOUGH.